(12) United States Patent
Jibbe et al.

(10) Patent No.: US 8,225,038 B2
(45) Date of Patent: Jul. 17, 2012

(54) STORAGE ARRAY BOOT AND CONFIGURATION

(75) Inventors: Mahmoud Jibbe, Wichita, KS (US); Senthil Kannan, Pondicherry (IN); Padmanabhan Pangurangan, Krishnagiri (IN)

(73) Assignee: Netapp, Inc., Sunnyvale, CA (US)

( * ) Notice: Subject to any disclaimer, the term of this patent is extended or adjusted under 35 U.S.C. 154(b) by 581 days.

(21) Appl. No.: 12/201,104

(22) Filed: Aug. 29, 2008

(65) Prior Publication Data

US 2010/0057986 A1 Mar. 4, 2010

(51) Int. Cl.
*G06F 12/00* (2006.01)

(52) U.S. Cl. ........ 711/114; 711/111; 711/100; 711/166; 711/170; 711/E12.084

(58) Field of Classification Search .................. 711/100, 711/111, 114, 166, 170, E12.084
See application file for complete search history.

(56) References Cited

U.S. PATENT DOCUMENTS

| | | | |
|---|---|---|---|
| 2004/0073747 A1* | 4/2004 | Lu | 711/114 |
| 2007/0079092 A1* | 4/2007 | Hara et al. | 711/114 |
| 2009/0276566 A1* | 11/2009 | Coatney et al. | 711/114 |

OTHER PUBLICATIONS

Patterson, David; Garth A. Gibson, Randy Katz (1988). "A Case for Redundant Arrays of Inexpensive Disks (RAID)". SIGMOD Conference: pp. 109-116. retrieved Dec. 31, 2006. http://en.wikipedia.org/w/index.php?title=RAID&printable=yes; date retrieved Jun. 18, 2008.

* cited by examiner

*Primary Examiner* — Midys Rojas
(74) *Attorney, Agent, or Firm* — Haynes and Boone, LLP

(57) ABSTRACT

A RAID storage array having a controller and plurality of disk drives is configured into a plurality of groups. The plurality of disk drives are in a plurality of drive trays. The controller includes a main memory. A set of configuration information is stored on a central nonvolatile memory device. The set of configuration information includes group configuration information corresponding to each group of the plurality of groups with which a corresponding disk drive is associated. The set of configuration information is stored on a plurality of remote nonvolatile memory devices that are each associated with at least one of the plurality of drive trays. A bootware control process is loaded into the main memory. The bootware control process is executed. A plurality of service layer processes are loaded into the main memory. The plurality of service layer processes are executed in parallel under the control of the bootware control process. The configuration information is read from the central nonvolatile memory device.

20 Claims, 4 Drawing Sheets

STORAGE ARRAY BOOT AND CONFIGURATION

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID).

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a RAID storage array having a controller and plurality of disk drives configured into a plurality of groups, wherein the plurality of disk drives are in a plurality of drive trays, and wherein the controller comprises a main memory, a method operable in the controller, comprising: storing a set of configuration information on a central nonvolatile memory device, wherein the set of configuration information includes group configuration information corresponding to each group of the plurality of groups with which a corresponding disk drive is associated; storing the set of configuration information on a plurality of remote nonvolatile memory devices each associated with at least one of the plurality of drive trays; loading a bootware control process into the main memory; executing the bootware control process; loading a plurality of service layer processes into the main memory; executing the plurality of service layer processes in parallel under the control of the bootware control process; and, reading the configuration information from the central nonvolatile memory device.

An embodiment of the invention may therefore further comprise a RAID storage array, comprising: a controller having a main memory; a plurality of disk drives configured into a plurality of groups; a plurality of drive trays associated with the plurality of disk drives; a central nonvolatile memory device storing a set of configuration information, wherein the set of configuration information includes group configuration information corresponding to each group of the plurality of groups with which a corresponding disk drive is associated; a plurality of remote nonvolatile memory devices each associated with at least one of the plurality of drive trays that store the set of configuration information; and wherein the controller loads a bootware control process into the main memory; and wherein the controller executes the bootware control process; and wherein the controller loads a plurality of service layer processes into the main memory; and wherein the bootware control process causes the plurality of service layer processes to be executed in parallel; and, wherein at least one of the plurality of service layer processes reads the configuration information from the central nonvolatile memory device.

An embodiment of the invention may therefore further comprise a method of operating a RAID storage system, comprising: initiating a boot process by loading and executing a boot manager process; loading and executing a first service layer process independent of a loading and executing of a second service layer process; reading configuration information from a central nonvolatile memory device; and, configuring a first disk drive and a second disk drive into at least a first group in accordance with the configuration information read from the central nonvolatile memory device.

DETAILED DESCRIPTION OF THE EMBODIMENTS

Figure 1:
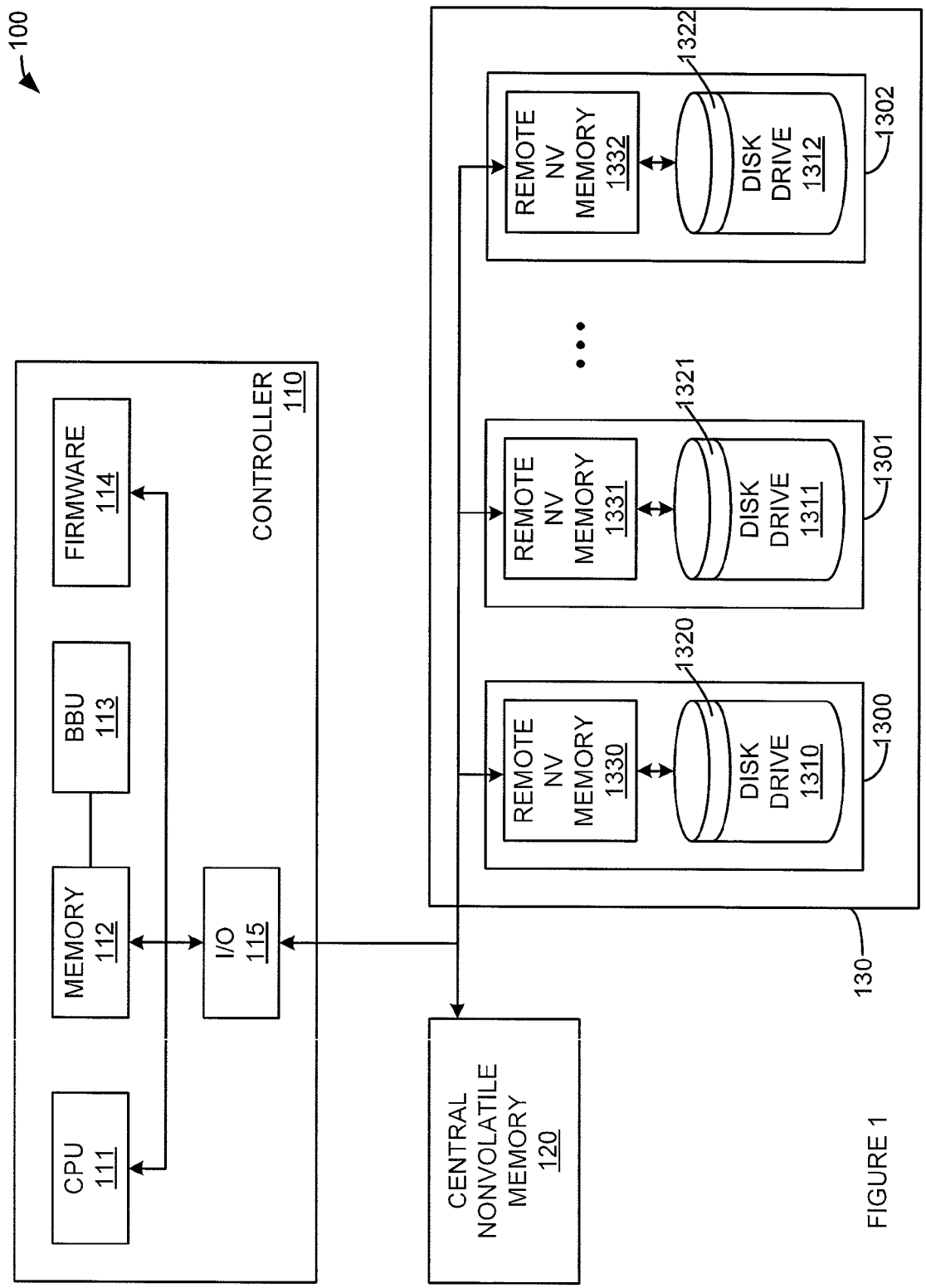
FIG. 1 is a block diagram illustrating a storage array.

FIG. 1 is a block diagram illustrating a storage array. In FIG. 1, storage array 100 comprises controller 110, central nonvolatile memory 120, and disk array 130. Controller 110 includes central processing unit (CPU) 111, main memory 112, battery backup unit (BBU) 113, firmware 114, and I/O 115. Disk array 130 includes drive tray 1300, drive tray 1301, and drive tray 1302. Drive tray 1300 includes disk drive 1310 and remote nonvolatile (NV) memory 1330. Disk drive 1310 includes disk array configuration store (DACstore) 1320. Drive tray 1301 includes disk drive 1311 and remote nonvolatile memory 1331. Disk drive 1311 includes DACstore 1321. Drive tray 1302 includes disk drive 1312 and remote nonvolatile memory 1332. Disk drive 1312 includes DACstore 1322.

CPU 111, main memory 112, firmware 114, and input/output (I/O) are all operatively coupled to each other. Battery back up unit 113 is operatively coupled to main memory 112. Thus, the contents of main memory 112 may be preserved even when storage array 100 is powered down, rebooted, or cycles through a start of day (SOD) sequence.

I/O 115 is operatively coupled to central nonvolatile memory 120 and disk array 130. In particular, I/O 115 is operatively coupled to disk trays 1300-1302. I/O 115 is also operatively coupled to remote nonvolatile memories 1330-1332. Remote nonvolatile memories 1330-1332 are operatively coupled to disk drives 1310-1312, respectively. Thus, remote nonvolatile memories 1330-1332 are operatively coupled to DACstores 1320-1322, respectively. Central nonvolatile memory 120 is operatively coupled to disk array 130 and disk trays 1300-1302. Thus, central nonvolatile memory 120 is operatively coupled to remote nonvolatile memories 1330-1332, disk drives 1310-1312, and DACstores 1320-1322.

Central nonvolatile memory 120 and remote nonvolatile memories 1330-1332 are preferably solid state nonvolatile memories. For example, central nonvolatile memory 120 and remote nonvolatile memories 1330-1332 may be solid state disk drives. Thus, central nonvolatile memory 120 and remote nonvolatile memories 1330-1332 may communicate with controller 110 using commands and procedures that are similar to those controller 110 uses to communicate with disk drives 1310-1312.

Controller 110 boots storage array 100 by loading a boot image from firmware 114 into main memory 112. The boot image includes at least a bootware control process. When controller 110 executes the bootware control process, the bootware control process loads into main memory 112 and executes a plurality of service layer processes. The plurality of service layer processes may be loaded and executed independently. In other words, the loading and execution of one service layer process may occur independent of the loading and/or execution of another service layer process. This allows the plurality of service layer process to reside in memory in dedicated regions and work in parallel.

The bootware control process has the ability to monitor and restart individual service layer processes according to various hardware or firmware triggers. Thus, all of the relevant services and applications of the service layer processes may function as interrelated and/or separate modules.

Examples of situations where controller 110 would boot storage array 100 are: (1) when storage array 100 is power cycled; (2) when storage array 100 is rebooted; (3) when storage array 100 is taken offline and then online (e.g., for maintenance); and, (4) when storage array 100 is restarted by an alternate storage array or an alternate controller when the alternate detects a problem. When storage array 100 is booted, the relevant service layer processes may be restarted in parallel. Thus, data required for the boot sequence may be readily available instead of a service layer process having to wait for a preceding process to complete in order to receive the data it needs to complete its part of the boot sequence.

Configuration information is stored in central nonvolatile memory 120. This configuration information may also be stored in one or more remote nonvolatile memories 1330-1332. This configuration information may also be stored on one or more disk drives 1310-1312 in DACstore 1320-1322, respectively. The configuration information includes information that describes each group of the disk array 130 in which a corresponding disk is a member. This group configuration information may include characteristics of the group, timestamps to identify the date/time of creation of the configured group, as well as a list of unique identification information for each disk drive 1310-1312 which is a member of a group. Examples of methods used to create, store, maintain, and utilize the configuration information stored on central nonvolatile memory 120 or remote nonvolatile memories 1330-1332 are given in U.S. Pat. No. 5,822,782 titled "METHODS AND STRUCTURE TO MAINTAIN RAID CONFIGURATION INFORMATION ON DISKS OF THE ARRAY" which is hereby incorporated herein by reference.

By storing the configuration information in central nonvolatile memory 120, the configuration information is rapidly available because the delays associated with disk drive 1310-1312 seek times are avoided. This speeds the boot process. Likewise, by storing configuration information in remote nonvolatile memories 1310-1312, delays associated with retrieving the configuration information from DACstore 1320-1322 are avoided. Avoiding these extra delays are particularly important when: (1) a large number of volumes are mapped to a host; or (2) premium features such as snapshot, volume copy, or remote mirroring are enabled.

Changes in the configuration information are monitored by a service layer process and updated in central nonvolatile memory 120. These changes may also be copied to one or more remote nonvolatile memories 1330-1332. Optionally, these changes to configuration information may also be copied to DACstore 1320-1322. These copies may be performed when the changes are determined (e.g., in parallel with the update to central nonvolatile memory 120), or at an asynchronous time thereafter.

A cache sync process resides in main memory 120. This process is one of the service layer processes. The cache sync process takes care of I/O transactions that were interrupted by the boot/reboot. In addition, during a boot/reboot a coordination layer process and a diagnostic process may restart in parallel (e.g., independent of other service layer processes and each other) in order to keep configuration information available so that other service layer processes can obtain it during the boot process.

Figure 2:
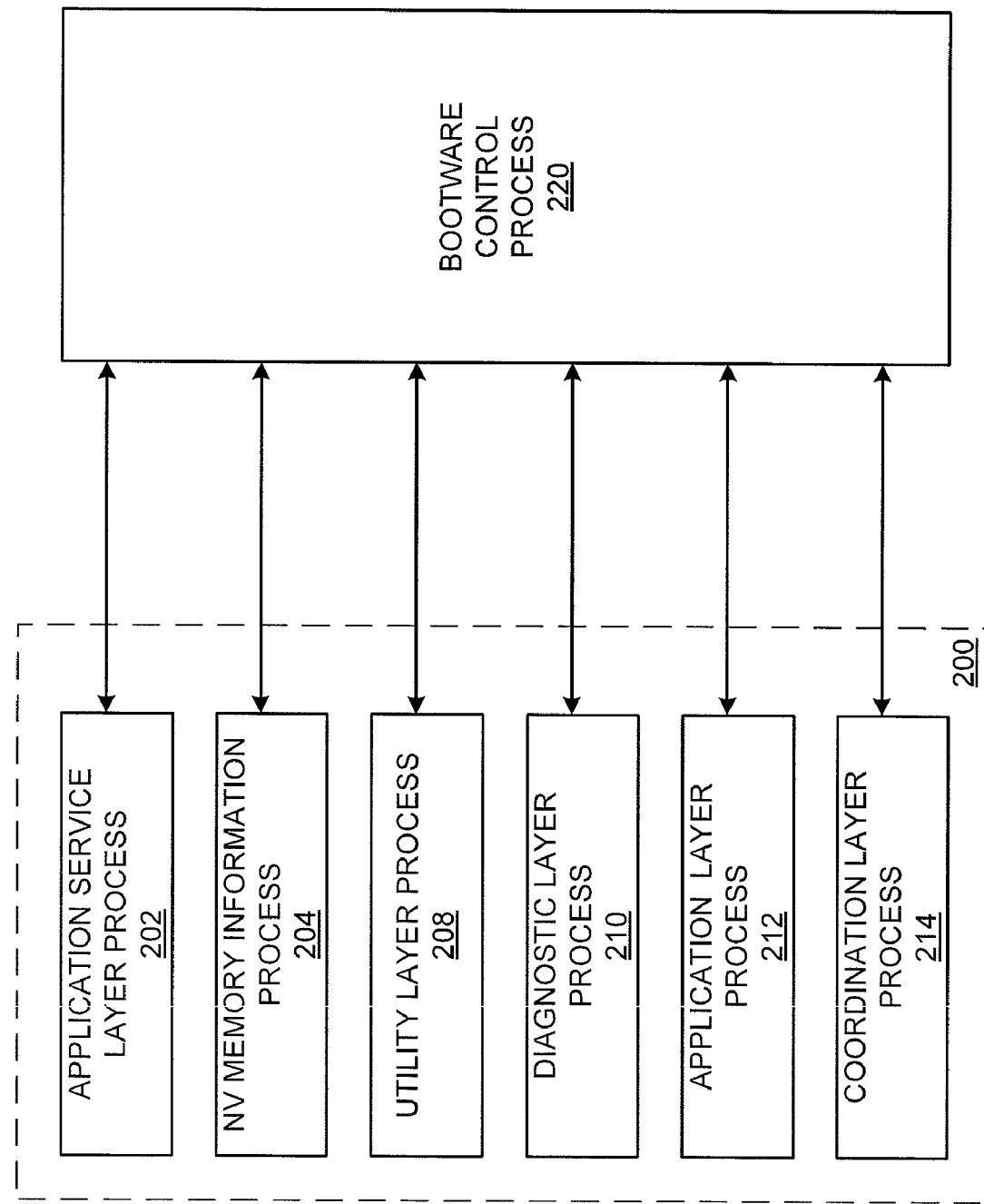
FIG. 2 is a block diagram illustrating a plurality of independent processes.

FIG. 2 is a block diagram illustrating a plurality of independent processes. In FIG. 2, a plurality of service layer processes 200 are shown each operatively and independently coupled to bootware control process 220. Thus, bootware process 220 may start, stop, and restart one or more of the plurality of service layer processes independent from at least one other service layer process.

In FIG. 2, the plurality of service layer processes 200 is shown comprised of: application service layer process 202; nonvolatile memory information process 204; utility layer process 208; diagnostic layer process 210; application layer process 212; and coordination layer process 214. Nonvolatile memory information process 204 may also be known as a stable-store process. These processes and layers given above are for illustration purposes only. Other relevant services, applications, sub-processes, or modules may be loaded and executed by bootware control process 220.

Figure 3:
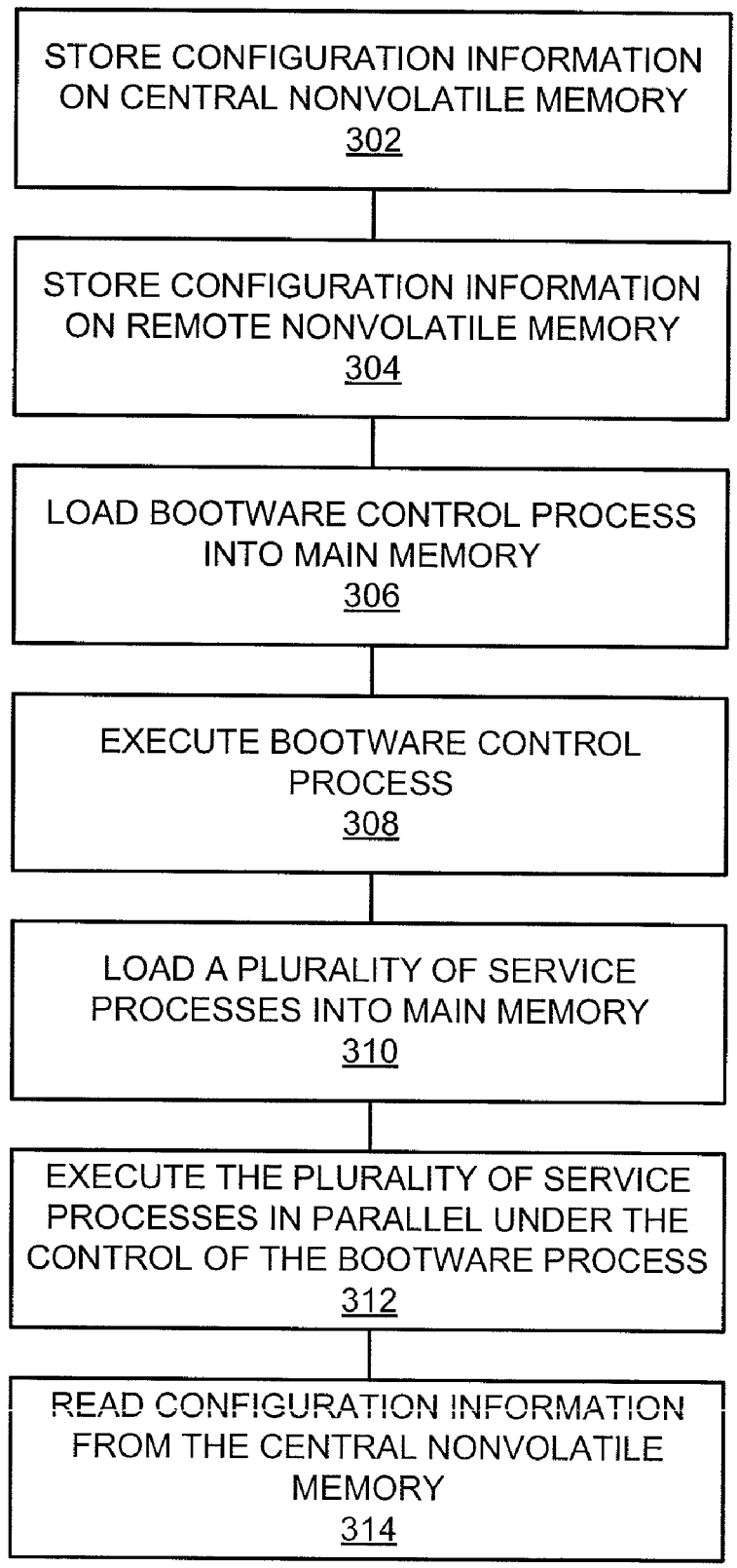
FIG. 3 is a flowchart illustrating a method of operating a RAID controller.

FIG. 3 is a flowchart illustrating a method of operating a RAID controller. The steps illustrated in FIG. 3 may be performed by one or more elements of storage array 100.

Configuration information is stored on a central nonvolatile memory (302). For example, configuration information may include information that describes each group of the disk array 130 in which a corresponding disk is a member. This group configuration information may include characteristics of the group, timestamps to identify the date/time of creation of the configured group, as well as a list of unique identification information for each disk drive 1310-1312 which is a member of a group. Other configuration information may be stored on central nonvolatile memory as well. In an example, this configuration information may be stored on central nonvolatile memory 120 by a nonvolatile information process 204 that is loaded and executed by bootware control process 220.

Configuration information is stored on a remote nonvolatile memory (304). For example, the configuration information that was stored on central nonvolatile memory 120 may be copied to one or more of remote nonvolatile memories 1330-1332. Other configuration information may be stored on a remote nonvolatile memory as well. In an example, this configuration information may be stored on a remote nonvolatile memory 1330-1332 by a nonvolatile information process 204 that is loaded and executed by bootware control process 220.

A bootware control process is loaded into main memory (306). For example, controller 110 may copy at least part of firmware 114 to main memory 112. A part of firmware 114 may contain the executable code for bootware control processs 220. The bootware control process is executed (308). For example, CPU 111 of controller 110 may start executing the bootware control process 220 that it loaded in step 306.

A plurality of service processes are loaded into main memory (310). For example, bootware control process 220 may load, from firmware 114, all or part of one or more of: an application service layer process 202; a nonvolatile memory information process 204; a utility layer process 208; a diagnostic layer process 210; an application layer process 212; and/or a coordination layer process 214. These processes may be loaded independently and in parallel by boot control process 220.

A plurality of service level processes are executed in parallel under the control of the bootware control process (312). For example, bootware control process 220 may execute, under its control, all or part of one or more of: application service layer process 202; nonvolatile memory information process 204; utility layer process 208; diagnostic layer process 210; application layer process 212; and/or coordination layer process 214. These processes may be executed independently and in parallel by boot control process 220.

Configuration information is read from the central nonvolatile memory (314). For example, the configuration information that describes each group of the disk array 130 in which a corresponding disk is a member that was written to central nonvolatile memory 120 in step 302 may be read. In an embodiment, configuration information may also be read from one or more of remote nonvolatile memories 1330-1332, and/or DACstores 1320-1322.

Figure 4:
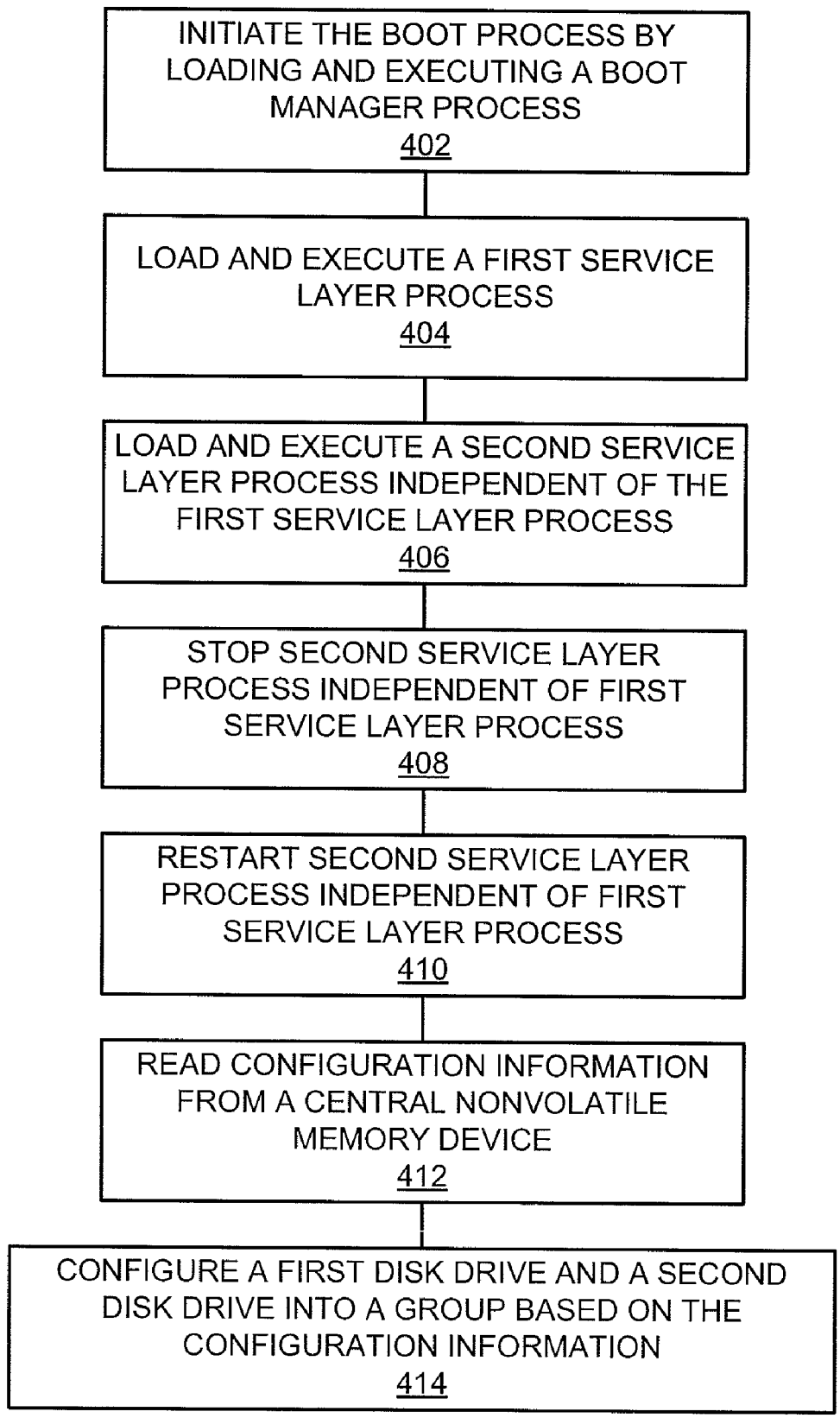
FIG. 4 is a flowchart illustrating a method of operating a RAID storage system.

FIG. 4 is a flowchart illustrating a method of operating a RAID storage system. The steps illustrated in FIG. 4 may be performed by one or more elements of storage array 100.

The boot process is initiated by loading and executing a boot manager process (402). For example, controller 110 may initiate a boot process by loading and executing boot control process 220. A first service layer process is loaded and executed (404). For example, controller 110, while executing boot control process 220, may load and execute a nonvolatile memory information process 204.

A second service layer process is loaded and executed independent of the first service layer process (406). For example, controller 110, while executing boot control process 220, may load and execute a diagnostic layer process 210 independent of the loading and execution of nonvolatile memory information process 204.

The second service layer process is stopped independent of the first service layer process (408). For example, controller 110, while executing boot control process 220, and based upon certain software, firmware, or hardware triggers, may stop diagnostic layer process 210 independent of the execution of nonvolatile memory information process 204. The second service layer process is restarted independent of the first service layer process (410). For example, controller 110, while executing boot control process 220, and based upon certain software, firmware, or hardware triggers, may restart diagnostic layer process 210 independent of the execution of nonvolatile memory information process 204.

Configuration information is read from a central nonvolatile memory device (412). For example, controller 110 may read configuration information from central nonvolatile memory 120 under the control of boot control process 220 and/or nonvolatile memory information process 204.

A first disk drive and a second disk drive are configured into a group based on the configuration information (414). For example, disk drive 1310 and disk drive 1311 may be configured by controller 110 into a RAID level 1+0 group based on the configuration information read from central nonvolatile memory 120 in step 412. In another example, disk drive 1310 and disk drive 1311 may be configured by controller 110 into a RAID level 5 group based on the configuration information read from central nonvolatile memory 120 in step 412.

In an embodiment, a first disk drive and a second disk drive may be configured into a group based on configuration information read from a source other than the central nonvolatile memory device. For example, disk drive 1310 and disk drive 1311 may be configured by controller 110 into a RAID level 5 group based on configuration information read from remote nonvolatile memory 1330. In another example, disk drive 1310 and disk drive 1311 may be configured by controller 110 into a RAID level 5 group based on configuration information read from DACstore 1320.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a RAID storage array having a controller and plurality of drives configured into a plurality of groups, wherein the plurality of drives are in a plurality of drive trays, and wherein the controller comprises a main memory, a method operable in the controller, comprising:

storing a set of configuration information on a central nonvolatile memory device, wherein the set of configuration information includes group configuration information corresponding to each group of the plurality of groups with which a corresponding drive is associated;

storing the set of configuration information on a plurality of remote nonvolatile memory devices each associated with at least one of the plurality of drive trays;

loading a bootware control process into the main memory;

executing the bootware control process;

loading a plurality of service layer processes into the main memory; wherein each of the service layer processes is independently coupled to the bootware control process;

executing the plurality of service layer processes in parallel under the control of the bootware control process; and, reading the configuration information from the central nonvolatile memory device.

2. The method of claim 1, further comprising:

reading the configuration information from the plurality of remote nonvolatile memory devices to determine a configuration of the plurality of groups.

3. The method of claim 1, further comprising:

stopping a first one of the plurality of service layer processes independent of a second one of the plurality of service layer processes.

4. The method of claim 3, further comprising:

starting the first one of the plurality of service layer processes independent of a third one of the plurality of service layer processes.

5. The method of claim 1, wherein the configuration information in the central nonvolatile memory device is maintained by a stable-store process, and wherein the nonvolatile memory information process is one of the plurality of service layer processes.

6. The method of claim 1, wherein the configuration information in central nonvolatile memory device is asynchronously copied to each of the remote nonvolatile memory devices.

7. The method of claim 1, wherein the main memory is battery backed up.

8. A RAID storage array, comprising:
- a controller having a main memory;
- a plurality of drives configured into a plurality of groups;
- a plurality of drive trays associated with the plurality of drives;
- a central nonvolatile memory device storing a set of configuration information, wherein the set of configuration information includes group configuration information corresponding to each group of the plurality of groups with which a corresponding drive is associated;
- a plurality of remote nonvolatile memory devices each associated with at least one of the plurality of drive trays that store the set of configuration information;
- and wherein the controller loads a bootware control process into the main memory;
- and wherein the controller executes the bootware control process;
- and wherein the controller loads a plurality of service layer processes into the main memory, each service layer process in the plurality of service layer processes being independently coupled to the bootware control process;
- and wherein the bootware control process causes the plurality of service layer processes to be executed in parallel; and,
- wherein at least one of the plurality of service layer processes reads the configuration information from the central nonvolatile memory device.

9. The RAID storage array of claim 8, wherein the controller reads the configuration information from the plurality of remote nonvolatile memory devices to determine a configuration of the plurality of groups.

10. The RAID storage array of claim 8, wherein the bootware control processes causes a first one of the plurality of service layer processes to be stopped independent of a second one of the plurality of service layer processes.

11. The RAID storage array of claim 10, wherein the bootware control processes causes the first one of the plurality of service layer processes to be started independent of a third one of the plurality of service layer processes.

12. The RAID storage array of claim 8, wherein the configuration information in central nonvolatile memory device is asynchronously copied to each of the remote nonvolatile memory devices.

13. The RAID storage array of claim 8, wherein the main memory is battery backed up.

14. A method of operating a RAID storage system, comprising:
- initiating a boot process by loading and executing a boot manager process;
- loading and executing a first service layer process independent of a loading and executing of a second service layer process, the second service layer process coupled to the bootware control process independently of the first service layer process;
- reading configuration information from a central nonvolatile memory device; and,
- configuring a first drive and a second drive into at least a first group in accordance with the configuration information read from the central nonvolatile memory device.

15. The method of claim 14, further comprising:
reading configuration information from a remote nonvolatile memory device associated with the first drive.

16. The method of claim 15, further comprising:
writing the configuration information to the remote nonvolatile memory device.

17. The method of claim 16, wherein the step of writing includes copying the configuration information from the central nonvolatile memory device to the remote nonvolatile memory device.

18. The method of claim 15, wherein the first service layer process causes the reading of the configuration information from the remote nonvolatile memory device.

19. The method of claim 16, wherein the first service layer process causes the writing of the configuration information to the remote nonvolatile memory device.

20. The method of claim 14, wherein the boot manager process stops the second service layer process independent of the first service layer process and restarts the second service layer process independent of the first service layer process.

* * * * *